June 14, 1955 T. M. WACHTER Re. 24,021
WATERPROOF WATCH
Original Filed Aug. 1, 1947 2 Sheets-Sheet 1
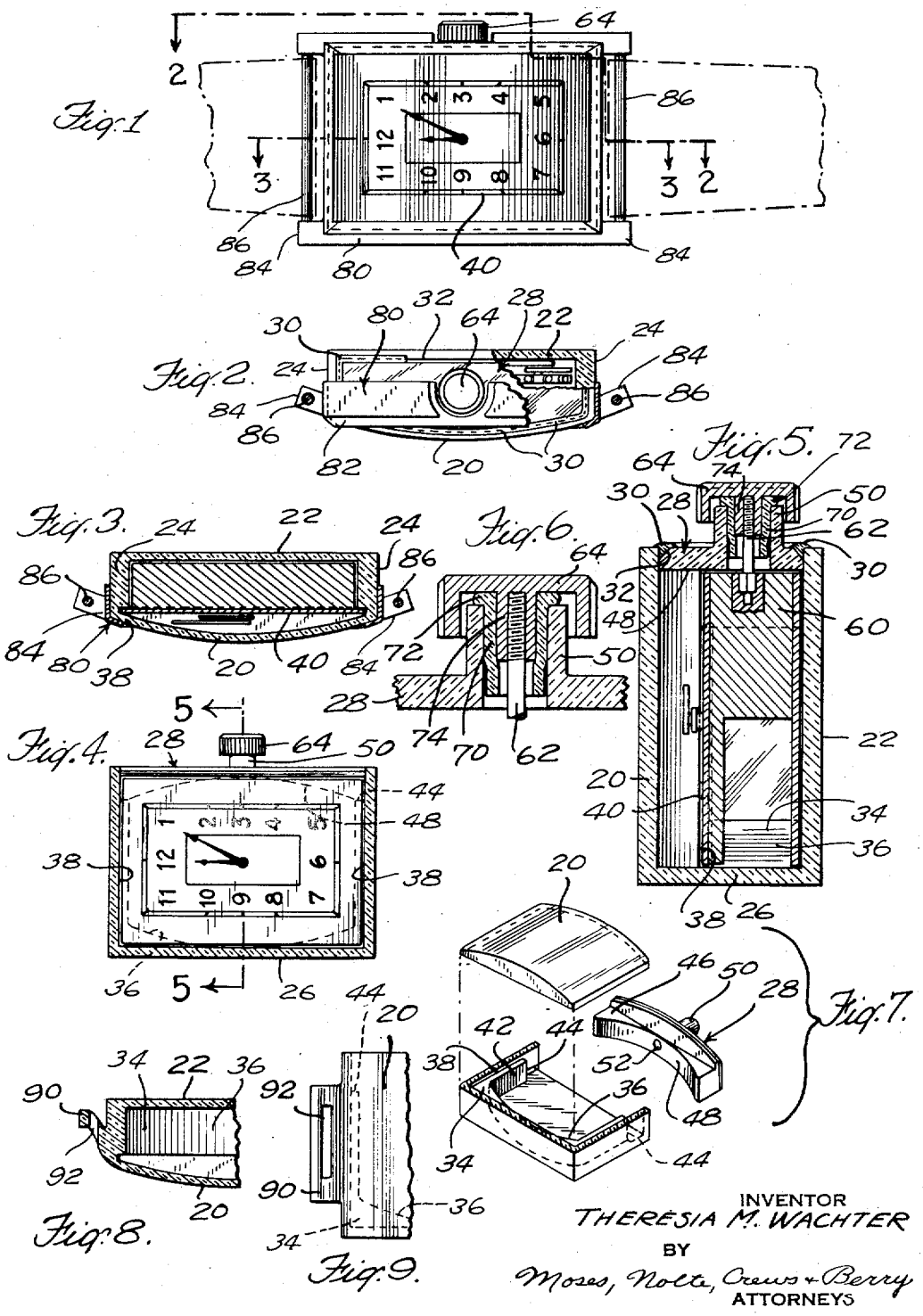
INVENTOR
THERESIA M. WACHTER
BY
Moses, Nolte, Crews + Berry
ATTORNEYS June 14, 1955 T. M. WACHTER Re. 24,021

WATERPROOF WATCH

Original Filed Aug. 1, 1947 2 Sheets-Sheet 2

INVENTOR
THERESIA M. WACHTER
BY
Moses, Nolte, Crews + Berry
ATTORNEYS

United States Patent Office

Re. 24,021

Reissued June 14, 1955

24,021

WATERPROOF WATCH

Theresia M. Wachter, New York, N. Y.

Original No. 2,682,146, dated June 29, 1954, Serial No. 765,409, August 1, 1947. Application for reissue October 27, 1954, Serial No. 465,161

12 Claims. (Cl. 58—90)

Matter enclosed in heavy brackets [ ] appears in the original patent but forms no part of this reissue specification; matter printed in italics indicates the additions made by reissue.

This invention relates to watch construction and particularly to watch cases formed of plastic material, either wholly or partly transparent.

A principal object of the invention is to provide a watchcase which is effectively water, moisture and dust tight. In the preferred construction this is accomplished by making the front of the watch constituting the crystal, and the back, sides and lower end of waterproof plastic or other transparent material preferably molded as a unit. The watch movement is inserted in this casing edgewise, the open end of the casing being closed by another piece of plastic material which can be sealed into the casing preferably by the use of a transparent plastic cement.

By making the entire casing of transparent plastic it is possible to determine whether or not the casing is actually waterproof and tightly sealed. If any water leaks into the casing it can be immediately detected by inspection and steps taken to remedy the situation before any harm is done to the watch movement. The sealing of the top in the casing by a thin layer of plastic cement is very effective and practically invisible. It furthermore permits the watch movement to be removed without difficulty as the sealing cement may be cut with a sharp blade or dissolved by a solvent, whereupon the movement is accessible. Resealing can be accomplished by a reapplication of cement. The watchcase being made of plastic material is practically rust and corrosion proof, and the plastic back of the watchcase, which in a wrist watch comes in contact with the skin, will not rub off and cause discoloration or irritation to the skin. The plastic material is furthermore a better heat insulator than metal so that it to some extent protects the watch movement against sudden changes in temperature. Condensation within the case is also reduced.

Another object of the invention is to provide an effective and permanent sealing means for preventing leakage around the stem of the watch, while still permitting the watch to be wound and set in the usual manner.

Other objects and advantages of the invention will appear in the course of the following description of certain embodiments thereof, chosen to illustrate the principles of the invention.

In the drawings:

Fig. 1 is a face view of a wrist watch embodying one form of the invention;

Fig. 2 is a view partly in plan and partly in section on line 2—2 of Fig. 1;

Fig. 3 is a horizontal sectional view of the watch shown in Fig. 1, the movement being indicated conventionally as a cross-hatched body;

Fig. 4 is a front view of the construction shown in Fig. 3 with the front of the case constituting the watch crystal cut away;

Fig. 5 is a transverse vertical sectional view of the watch and case on line 5—5 of Fig. 4, the watch movement being shown conventionally;

Fig. 6 is a fragmentary view in vertical section on an enlarged scale of the watch stem construction;

Fig. 7 is a perspective exploded view of the watch case of the form shown in Figs. 1 to 5;

Fig. 8 is a fragmentary transverse sectional view of a modified form of case;

Fig. 9 is a fragmentary front elevation of the case shown in Fig. 8;

Figure 10:
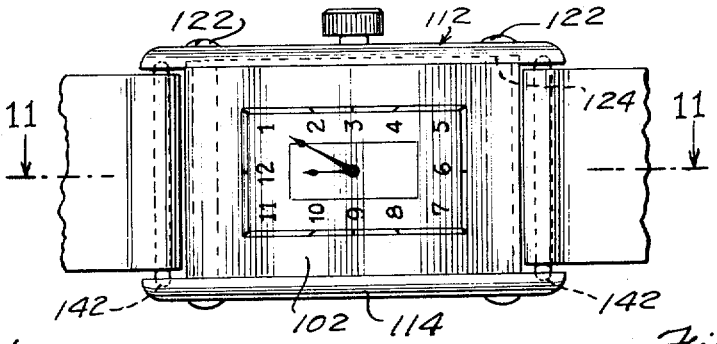
Fig. 10 is a front view of a modified form of wrist watch construction.
Figure 11:
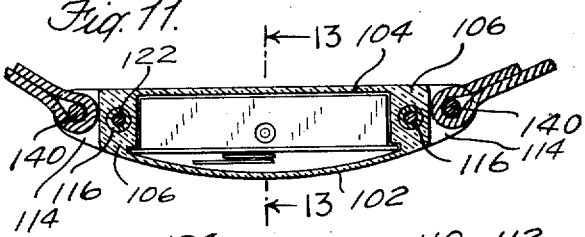
Fig. 11 is a transverse sectional view on line 11—11 of Fig. 10.
Figure 13:
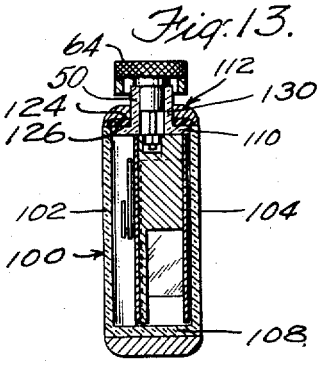
Fig. 13 is a vertical transverse section on line 13—13 of Fig. 11.
Figure 12:
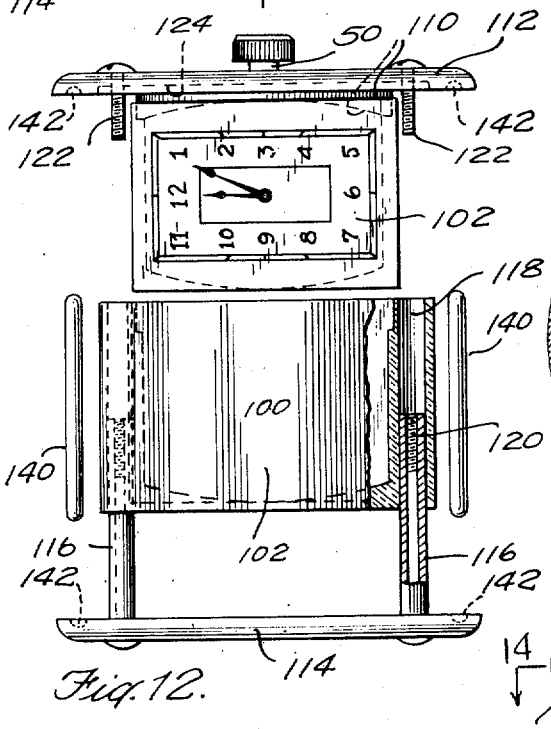
Fig. 12 is a disassembled view partly in front elevation and partly in vertical section of the construction shown in Fig. 10.

The examples of the invention illustrated in the drawings are wrist watches, but it is to be understood that the invention may be used in connection with any other type of watch.

Referring to the form of the invention shown in Figs. 1 to 7, a casing is provided which is preferably molded as a unitary tubular or hollow body of plastic, comprising a watch crystal 20, a back 22, sides 24 and a bottom or end 26. This casing unit may be formed of one or more parts cemented or welded together, but molding in one unit is most satisfactory as it eliminates unsightly joints and the possibility of leakage. It is also the most economical process.

The casing is preferably formed of a transparent plastic which may be either clear or colored, suitable plastics being Lucite, Plexiglas, polystyrene or other suitable compounds, or the casing may be made of glass, although this has the disadvantage of breaking more easily. The top or open end of the casing is closed by a tight fitting *end wall* [top piece] or cover plate 28 which is also preferably made of the same transparent plastic material as the body of the casing, and which is of such size as to fit in the open end of the casing and be sealed therein in any suitable manner. Preferably the sealing is accomplished by a layer of plastic cement indicated as 30 in Fig. 5. A thin layer of transparent cement may be used which is practically invisible so that the entire watchcase looks like a body of transparent crystal, revealing the watch movement, the appearance being very pleasing and effective. In order to hold a small amount of the cement so as to make a good seal, the top edge of the cover plate is preferably beveled slightly as indicated at 32. The fit of the cover plate into the open end of the casing below this bevel is preferably a close push fit, so that the cement is effectively prevented from getting into the space below the bevel. The cement being limited to this somewhat bevelled space and to the top of the casing may readily be removed or severed with a sharp knife blade or the like or may be softened or dissolved with a solvent thereby permitting the cover to be taken out when access to the watch movement is desired.

The inside of the casing and cover are preferably shaped so as to receive and firmly hold a watch movement. In the construction shown the watch movement is of usual tonneau form, the dial being shown as rectangular. For use with a movement of this shape the casing has a thickened bottom part 34 formed with a curved surface 36 (Fig. 7) upon which the movement seats, there being a recess 38 between the crystal and the thickened portion 34 to receive the edge of the rectangular watch dial 40. The side walls of the casing are also provided with thickened seating portions 42, the space 38 extending between these portions and the crystal so as to receive the dial. The top ends 44 of these thickened side portions 42 form seats for receiving the corners of a seat portion 46 formed on the lower side of the cover plate 28. The curved surface 48 of this seat portion fits the edge of the watch movement thereby holding the same firmly within the casing when the cover plate is closed. Of course if a round or rectangular watch movement were used the seats for the same would be shaped to fit it. By providing the seats shaped to fit the movement, unnecessary space within the case is filled thereby reducing the amount of air within the case and cutting down condensation. On top of the cover plate is formed an integral neck 50 through which is a hole 52 for receiving the winding stem of the watch.

60 is the watch movement which is indicated conventionally and with which is connected the winding stem 62 on the upper end of which is secured the usual crown cap 64 by which the watch may be wound and set. The stem serves to hold the watch movement normally in assembled relationship with the cover plate 28 of the case so that the movement is inserted into the case at the time the cover plate is fitted into the open end of the casing. When the movement is to be removed, the seal is cut and the lifting out of the cover plate and stem removes the movement from the casing.

An important feature of the invention comprises the means for sealing the joint between the stem of the watch and the neck [in the cover plate] so as to prevent leakage at this point, while still permitting the watch to be wound and set. In the construction shown a sleeve 70 which is preferably of plastic and may be of a nature similar to the plastic of which the casing is constructed, and which is preferably provided with a small top flange 72, is fitted closely on to the core 74 of the crown cap 64 into which the upper end of the winding stem 62 is screwed. The plastic sleeve 70 is slightly elastic, and fits the core 74 so tightly that it is preferably somewhat expanded in diameter where it surrounds the core as shown in Fig. 6. In its expanded condition it is of such external diameter that it will fit very tightly into the plastic neck 50 [projecting from the top plate 28,] and may even be compressed slightly between the inner wall of the neck and core 74. The neck and the sleeve both being of plastic there is a certain temporary adherence between the two, more so than there probably would be between metal and plastic surfaces. A highly effective water tight seal is thus produced, and this seal will maintain its tightness under varying conditions of temperature, humidity, etc., because the material of the neck and material of the sleeve 70, both parts being plastic, have the same or similar coefficients of expansion and therefore will not be caused to draw away from one another due to temperature changes, etc. A permanently tight seal is thus provided. At the same time the plastic sleeve has sufficient yield so that while the seal is tight, it is still possible to rotate the crown cap in the sleeve 70 for the purpose of winding the watch, or to move it in and out to effect the setting of the watch. All this can be done without permitting any leakage. The flange 72 at the top of the sleeve 70 preferably fits closely against the inside of the crown cap when the crown cap and stem 62 are pushed in after the watch has been set, and also fits against the outer end of the neck 50 as shown in Fig. 6. This helps to secure the tightness of the seal.

It will be seen that the front face of the curved seat portion 46 on the cover plate, together with the faces of the parts 42 and 35 at the sides and bottom of the recess 38 form a ledge all the way around the casing for receiving the margin of the watch dial.

The watchcase described above may be used for a pocket watch or mounted in any suitable manner. In the construction shown the case is fitted within a bezel frame 80 of rectangular form and having a narrow flange 82 overlying the edge of the front or crystal portion of the watchcase so as to provide an attractive finish. The back of the watchcase which comes in contact with the skin has no metal part thereon, so that there is no discoloration of the wrist. The bezel frame 80 is provided with ears 84 carrying pins 86 to which are fixed the wrist strap indicated in broken lines. Obviously any other suitable construction for attaching a strap, band or bracelet may be employed.

Figs. 8 and 9 show a modified construction of case in which no bezel frame is used, but the case itself has slotted lugs 90 molded integrally therewith out of plastic material. Wrist straps would be passed through the slots 92 in these lugs.

A modified form of case is shown in Figs. 10 to 13 inclusive. In this construction the body of the case 100 is preferably molded as an integral hollow body of plastic having a front transparent crystal portion 102, a back 104, sides 106, and a bottom or end 108. In this construction a plastic cover plate is also preferably provided, such plastic plate being indicated at 110. This plastic plate, however, need not be cemented into the casing, as other means are provided for sealing the top of the casing. For this purpose the casing is provided with metal top and bottom clamping plates 112 and 114 which fit the top and bottom ends of the casing, and are firmly clamped together so as to grip the casing between them. Any suitable construction may be used for this purpose. As shown, the bottom plate 114 has tubes 116 projecting upwardly therefrom, these tubes projecting through holes 118 formed in the side walls of the casing. The tubes 116 are internally threaded as indicated at 120. Screws 122 pass through holes in the top plate 112 and screw into the threaded ends of the tubes 116, thereby drawing the two clamping plates together as forcibly as may be necessary. The top plate 112 has a recess 124 in its lower face in which is placed a suitable resilient packing 126 of rubber, vinyl, plastic treated leather or other suitable material which fits against the top of the wall of the casing so that when the clamping plates are tightly screwed towards each other this packing will effectually seal the joint at the open end of the casing, thereby preventing leakage. This method of sealing is satisfactory for some purposes, but is not believed to be as effective and permanent a seal as that obtained by the use of plastic cement. However, it permits access to the watch movement without the necessity of cutting the cement seal, as in the construction previously described. The joint around the watch stem may be sealed in any suitable manner. Preferably the same construction is used as in the form of casing already described. For this purpose the *end wall 110* [closure plate 110] is provided with a plastic neck 50 which projects through a hole 130 in the *adjacent* [top] clamping plate [112].

The use of the clamping plates 112 and 114 provides a convenient means for mounting the watch. In the construction shown pins 140 are provided which may be held at their ends in recesses 142 in the top and bottom clamping plates, so that when the parts are assembled a wrist band of any suitable type may be connected to these pins.

Figure 14:
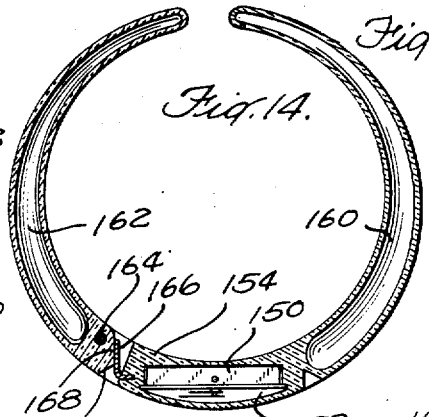
Fig. 14 is a horizontal sectional view showing a buoyant watch bracelet, the section being taken on line 14—14 of Fig. 15.
Figure 15:
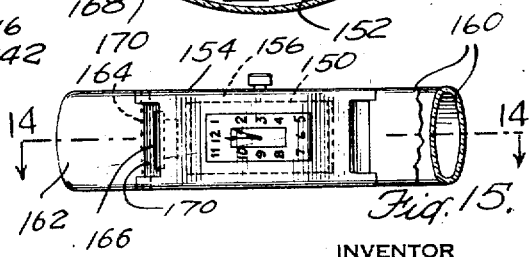
Fig. 15 is a front elevation of the watch bracelet shown in Fig. 14.

Figures 14 and 15 show a wrist watch construction which is not only waterproof, but buoyant, so that if it becomes detached from the wrist of the wearer, it will float and permit ready recovery. In the construction shown a watch movement 150 is employed which is preferably of as small and light a construction as is available. This is mounted in a chamber 152 in a case 154 made of a light plastic, the movement being sealed in the case by means of a closure plate 156 similar to those already described. Attached to the ends of the case are hollow wrist enclosing arms 160 and 162 which are formed of light plastic and which have chambers of such size therein as to provide, with the space 152 in which the movement is mounted, sufficient buoyancy so that the wrist watch as a whole will float. One of the hollow arms 162 is preferably hinged to the case so that it will swing about a pivot 164 thereby permitting the bracelet to be opened for application to the wrist. Any suitable construction of hinge may be used. As illustrated, a flat spring 166 is provided which bears against a flat surface 168 on the end of the pivoted arm. When the arm is swung to open position the spring bears against the surface 170 so as to hold it open until such time as it is to be snapped shut about the wearer's wrist.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be embodied.

What I claim is:

1. A watchcase composed of plastic including a transparent front comprising a crystal, a back, sides and end united to form a self-sustaining unitary casing into which a watch movement may be inserted edgewise, and a plastic closure for the open end of the casing fitting tightly inside thereof, and wholly supported by its engagement therewith, said casing and closure having like properties of expansion and contraction, whereby there is no tendency for the closure to work loose from its tight engagement with the casing due to differential expansion and contraction, the inside of the end wall of the casing and the inside wall of the closure being shaped to provide seats for engaging the edges of a watch movement, said seats being spaced from the inside of the crystal to provide a groove for receiving the watch dial, the walls of the seats facing the groove forming a seat for the margin of the dial.

2. A watch comprising a plastic casing having a watch movement mounted edgewise therein, the winding stem of the watch movement projecting out of the open end of the casing and a plastic closure for the open end of the casing, said closure having an integral tubular neck of plastic material projecting from the top thereof through which the winding stem of the watch extends, and a sealing tube of plastic material fitting tightly in the tubular neck and tightly surrounding a portion of the winding stem, the casing, closure, neck and sealing tube having similar properties of expansion and contraction, the closure member being wholly supported by its engagement with the plastic walls of the casing so that there is no tendency for the sealing engagement between the closure member and casing to work loose due to differential expansion and contraction.

3. In watch construction, a casing of plastic material having a watch movement mounted edgewise therein, said casing having an open end through which the watch movement may be inserted or removed, a closure of plastic material fitting in said open end and having a tubular neck of plastic material projecting therefrom, the winding stem of the watch movement projecting through said tubular neck and carrying a crown cap having a cylindrical core portion, and a sealing sleeve of slightly elastic plastic material fitting tightly around said core portion and being of such diameter relative to said core portion as to be slightly expanded thereby, said sleeve fitting tightly in the tubular plastic neck of the closure so as to seal the joint between the neck and the winding stem and crown cap, while permitting rotary and slight endwise movement of the winding stem to enable the watch to be wound and set, the casing, closure, neck and sealing tube having similar properties of expansion and contraction, the closure member being wholly supported by its engagement with the plastic walls of the casing so that there is no tendency for the sealing engagement between the closure member and casing to work loose due to differential of expansion and contraction.

4. In [wirst] *wrist* watch construction, a substantially rigid, self-sustaining plastic shell having an open end for receiving a watch movement edgewise therein, a plastic closure fitting in said open end and wholly supported by its engagement therewith, said casing and closure having like properties of expansion and contraction, whereby there is no tendency for the closure to work loose from its tight engagement with the casing due to differential expansion and contraction, said shell having holes extended vertically thereof at each side of the space for the watch movement, a clamping plate having a packing therein for fitting on the top edge of the shell and sealing the joint between the closure member and the shell, a second clamping member fitting against the other end of the shell, one of said members having internally threaded tubular portions projecting through the holes at the edges of the shell and screws engaging the other clamping member and screwing into said screw threaded tubular portions, and wrist strap attaching members carried by said clamping members, said clamping members being supported against the clamping pressure of said screws entirely by the self-sustaining plastic shell and closure.

5. A watch case construction comprising a substantially rigid, self-sustaining plastic shell open at one end for edgewise reception of a watch movement, said shell having transverse seats formed therein adjacent to said open end, a plastic closure member fitting tightly in the open end of said shell and engaging said seats, said closure member having an integral neck projecting therefrom for receiving the winding stem of a watch movement, and clamping members for covering the ends of said plastic shell and closure member, the member covering the end of the shell with the closure member fitting therein containing a packing for sealing the joint between the closure member and shell and having a hole therein through which said neck on the closure member projects, and means for connecting said clamping members together and drawing them tightly against the ends of the shell and closure member.

6. A substantially rigid, self-sustaining watch case composed of plastic including a transparent front forming a crystal, a back, sides and end molded as a unitary casing into which a watch movement may be inserted endwise, a plastic closure member fitting in the open end of the casing, the inside of the end wall of the casing and the inside wall of the closure being shaped to provide seats for engaging the edges of a watch movement, said seats being spaced from the inside of the crystal to provide a groove for receiving the margin of the watch dial, the walls of the seats facing the groove forming a support for the margin of the dial, the inner side walls of the casing being provided with transverse seats for supporting the closure member and limiting its movement into the casing, said closure member having an integral neck for reception of the winding stem of the watch, clamping members for engaging the ends of the casing and closure member, the clamping member engaging the closure member having a hole therein through which the winding stem neck passes and containing a packing for sealing the joint between the closure member and shell, and means for connecting said clamping members together and drawing them tightly against the ends of the shell and closure member.

7. A watch case for a watch movement of non-rectangular outline having a substantially rectangular dial of larger area than the movement so as to provide a projecting dial edge surrounding the movement, said case comprising a substantially rectangular rigid self-sustaining casing of plastic including a transparent front forming a crystal, a back, sides and end molded as a unitary casing into which the watch movement may be inserted endwise, a plastic closure member fitting in the open end of the casing, the inside end wall of the casing and the inside wall of the closure being shaped to conform to the outline of the watch movement so as to provide seats for engaging the edges of the movement, said seats providing thickened portions reinforcing the corners of the casing to increase the rigidity thereof, said seats being spaced from the inside of the crystal to provide a groove for receiving the margin of the watch dial, the walls of the seats facing the groove forming a support for the margin of the dial, the inner side walls of the casing being provided with transverse seats for supporting the closure member and limiting its movement into the casing, said closure member having an integral neck for the reception of the winding stem of the watch, and means for sealing the closure member in the casing, said casing and closure member having like properties of expansion and contraction, the closure member being wholly supported by its engagement with the plastic walls of the casing so that there is no tendency for the sealing engagement between the closure member and casing to work loose due to differential expansion and contraction.

*8. In watch construction, a case comprising a substantially rigid self-sustaining plastic shell including a transparent front comprising a crystal, a back, sides and an end wall united to form a self-sustaining unitary casing body into which a watch movement may be inserted edgewise and a plastic end wall constituting a closure for the open end of the casing body fitting tightly thereto, said end wall closure member being wholly supported by engagement with the plastic walls of the casing body, so that there is no tendency for the sealing engagement between said end wall closure member and casing body to work loose due to differential expansion and contraction, one of the end walls of the case having a tubular neck formed integrally therewith through which neck the winding stem of the watch extends, and a sealing tube of plastic material fitting tightly in the tubular neck and tightly surrounding a portion of the winding stem, said neck and sealing tube having similar properties of expansion and contraction.*

*9. In watch construction, a case of plastic material having a transparent front comprising a crystal, a back, sides and an end wall united to form a self-sustaining unitary shell into which a watch movement may be inserted edgewise, and a second end wall forming a plastic closure fitting in the open end of the shell so as to retain the watch movement therein, one of said end walls of the case having a tubular neck of plastic material projecting therefrom, the winding stem of the watch movement projecting through said tubular neck and carrying a crown cap having a cylindrical core portion, and a sealing sleeve of slightly elastic plastic material fitting tightly around said core portion and being of such diameter relative to said core portion as to be slightly expanded thereby, said sleeve fitting tightly in said tubular plastic neck so as to seal the joint between the neck and the winding stem and crown cap, while permitting rotary and slight endwise movement of the winding stem to enable the watch to be wound and set, the shell, closure, neck and sealing tube having similar properties of expansion and contraction, the closure member being wholly supported by its engagement with the plastic walls of the shell so that there is no tendency for the sealing engagement between the closure member and shell to work loose due to differential of expansion and contraction.*

*10. A watch case construction comprising a substantially rigid self-sustaining plastic shell including a front, back, sides and a fixed end wall, the other end being open for edgewise reception of a watch movement, said shell having transverse seats formed therein adjacent to said open end, a plastic end wall forming a closure member fitting tightly in the open end of said shell and engaging said seats, one of the end walls of the case having an integral neck projecting therefrom for receiving the winding stem of the watch movement, and clamping members for covering the fixed end wall and closure member end wall of the case, the member covering the end of the shell with the closure member wall fitting therein carrying a packing for sealing the joint between the end wall closure member and shell, the clamping member engaging the end wall having the neck thereon having a hole therein through which said neck projects, and means for connecting said clamping members together and drawing them tightly against the respective ends of the shell.*

*11. A substantially rigid, self-sustaining watch case composed of plastic including a transparent front forming a crystal, a back, sides and end molded as a unitary casing into which a watch movement may be inserted edgewise, a plastic end wall constituting a closure member fitting in the open end of the casing, the insides of the fixed end wall and of the closure member end wall being shaped to provide seats for engaging the edges of a watch movement, said seats being spaced from the inside of the crystal to provide a groove for receiving the margin of the watch dial, the walls of the seats facing the groove forming a support for the margin of the dial, the inner side walls of the casing being provided with transverse seats for supporting the closure member end wall and limiting its movement into the casing, one of said end walls having an integral neck for reception of the winding stem of the watch, clamping members for engaging the end walls of the casing, the clamping member engaging the end wall having the winding stem neck thereon having a hole therein through which the said neck passes, the clamping member engaging the end wall closure member containing a packing for sealing the joint between said end wall closure member and shell and means for connecting said clamping members together and drawing them tightly against the respective ends of the shell.*

*12. A watch case for a watch movement of non-rectangular outline having a substantially rectangular dial of larger area than the movement so as to provide a projecting dial edge surrounding the movement, said case comprising a substantially rectangular rigid self-sustaining casing of plastic including a transparent front forming a crystal, a back, sides and end molded as a unitary casing into which the watch movement may be inserted edgewise, a removable end wall forming a plastic closure member fitting in the open end of the casing, the insides of the end walls of the casing being shaped to conform to the outline of the watch movement so as to provide seats for engaging the edges of the movement, said seats providing thickened portions reinforcing the corners of the casing to increase the rigidity thereof, said seats being spaced from the inside of the crystal to provide a groove for receiving the margin of the watch dial, the walls of the seats facing the groove forming a support for the margin of the dial, the inner side walls of the casing being provided with transverse seats for supporting the end wall closure member and limiting its movement into the casing, one of said end walls having an integral neck for the reception of the winding stem of the watch and means for sealing the end wall closure member in the casing, said casing and end wall closure member having like properties of expansion and contraction, the end wall closure member being wholly supported by its engagement with the plastic walls of the casing so that there is no tendency for the sealing engagement between the end wall closure member and the casing to work loose due to differential expansion and contraction.*

References Cited in the file of this patent or the original patent

UNITED STATES PATENTS

| | | |
|---|---|---|
| 969,680 | Worrell | Sept. 6, 1910 |
| 1,340,003 | Benjamin et al. | May 11, 1920 |
| 2,260,835 | Haapanen et al. | Oct. 28, 1941 |
| 2,302,340 | Morf | Nov. 17, 1942 |
| 2,465,571 | Boninchi | Mar. 25, 1949 |

FOREIGN PATENTS

| | | |
|---|---|---|
| 115,559 | Switzerland | July 1, 1926 |
| 213,951 | Switzerland | June 16, 1941 |
| 507,868 | Great Britain | June 22, 1939 |